United States Patent [19]
Hall

[11] Patent Number: 6,025,422
[45] Date of Patent: Feb. 15, 2000

[54] FLAME RETARDANT POLYMER COMPOSITIONS

[75] Inventor: Donald K. Hall, Mooresville, N.C.

[73] Assignee: Siecor Operations, LLC, Hickory, N.C.

[21] Appl. No.: 09/086,876

[22] Filed: May 29, 1998

[51] Int. Cl.[7] .................. C08K 3/10; C08K 3/34
[52] U.S. Cl. .............. 524/405; 524/436; 524/437; 524/492; 428/522
[58] Field of Search .................... 524/405, 436, 524/437, 492; 428/522

[56] References Cited

U.S. PATENT DOCUMENTS

| | | | |
|---|---|---|---|
| 4,761,449 | 8/1988 | Lutz | 524/424 |
| 4,851,470 | 7/1989 | George | 524/612 |
| 4,885,328 | 12/1989 | Danforth et al. | 525/424 |
| 4,921,897 | 5/1990 | Danforth et al. | 524/405 |
| 4,935,304 | 6/1990 | Danforth | 428/423.1 |
| 4,994,513 | 2/1991 | Syrier et al. | 524/210 |
| 5,102,942 | 4/1992 | Machado et al. | 524/451 |
| 5,232,786 | 8/1993 | Waters et al. | 428/475.8 |
| 5,300,338 | 4/1994 | Byrd, Jr. et al. | 428/36.6 |
| 5,304,619 | 4/1994 | Yokoyama et al. | 526/311 |
| 5,424,344 | 6/1995 | Lewin | 524/83 |
| 5,500,285 | 3/1996 | Carletti et al. | 428/364 |
| 5,684,117 | 11/1997 | Londa et al. | 528/220 |

FOREIGN PATENT DOCUMENTS

| | | | |
|---|---|---|---|
| 0418094B1 | 12/1995 | European Pat. Off. | G02B 6/44 |

OTHER PUBLICATIONS

Carilon® Thermoplastic Polymers, Research Product CRP 4001; May, 1997.

Development of Flame Retardant Aliphatic Polyketone Compounds; Carilon® Thermoplastic Polymers (Presented at Society of Plastics' Engineers Annual Technical Conference, May 1995, Boston, Mass.).

*Primary Examiner*—Kriellion Sanders
*Attorney, Agent, or Firm*—Timothy J. Aberle

[57] ABSTRACT

A composition that includes a hydrated inorganic filler and a polymer blend is disclosed. The polymer blend includes a polymerization or copolymerization product of one or more ethylenically unsaturated monomers. In addition, the polymer blend includes an aliphatic polyketone. The incorporation of aliphatic polyketone with polyethylene based polymers or copolymers results in dramatic improvements in both drip resistance and char strength; moreover, the composition of the present invention can use reduced amounts of hydrated inorganic filler relative to conventional polyethylene based compositions. This reduction in the amount of hydrated filler is expected to lead to improvements in physical properties and extrudability not otherwise possible. These properties make the compositions of the present invention particularly useful as an outer layer for electrical wires, optical fibers, or cables containing at least one wire, optical fiber, or both.

26 Claims, No Drawings

FLAME RETARDANT POLYMER COMPOSITIONS

FIELD OF THE INVENTION

The present invention relates to polymer compositions and, more particularly, to polymeric compositions having flame retardant properties.

BACKGROUND OF THE INVENTION

Polyvinylchloride ("PVC"), tetrafluoroethylene-hexafluoropropylene copolymers ("FEP"), polyvinylidinedifluoride ("PVDF"), and other halogen containing polymers are flame retardant materials for the insulation and jacketing of electrical, fiber optic, and composite cables.

Growing concern regarding the toxicity and corrosivity of combustion byproducts from these materials has led to the development of several generations of nonhalogenated flame retardant materials. Many of these products are based upon low cost olefinic polymers, such as polyethylene or polyethylene copolymers. The flammability of these low cost polymers is reduced by adding large amounts (up to 65% by weight) of hydrated mineral fillers such as aluminum trihydrate ("ATH") or magnesium hydroxide ($Mg(OH)_2$). Numerous other mineral fillers are also used alone or in combination with the above fillers for cost dilution or performance modification. Polyethylene may be a poor polymeric host for hydrated mineral fillers due to the high polarity of these fillers in comparison to the nonpolarity of polyethylene. Addition of large amounts of hydrated mineral filler results in compositions having poor physical properties. Moreover, these compositions perform poorly as flame retardant cable jacket compounds, because they tend to drip during burning and fail to form a strong char layer. Formation of a strong, protective char layer is desirable to prevent the typically more flammable core materials from being exposed to the fire.

Developments have also emerged based upon polyethylene copolymers such as polyethylene-vinyl acetate ("EVA"), polyethylene-methyl acrylate ("EMA"), polyethylene-ethyl acrylate ("EEA"), polyethylene-n-butyl acrylate ("EnBA"), and others. These materials have a degree of polarity which improves their acceptance of hydrated mineral fillers resulting in improved filler dispersion, improved physical properties, and improved flame retardancy. However, these materials still suffer in performance due to their poor ability to form a high integrity char during combustion. For example, the decomposition chemistry of EVA is such that a high degree of carbonaceous char forms only after considerable molecular weight/viscosity breakdown occurs. In industry standard vertical cable burn tests, such as IEEE 383, this presents a problem in some cable constructions, because the flame retarded jacket material may drip off prior to the formation of a strong char. The decomposition chemistry of the acrylate based copolymers is different from that of EVA In particular, the viscosity breakdown of these compounds is slower, resulting in a reduced tendency to drip during burning. Unfortunately, these materials produce very little carbonaceous char; instead, decomposition produces a white ash residue, which has very little strength.

Developments aimed at improving the performance of EVA based compounds have been numerous. These developments have often been based upon the addition of a silicone rubber or a high viscosity silicone fluid or upon some type of silane modification of the base resin or filler. Other approaches add thixotropic fillers or viscosity modifiers to prevent dripping during burning. Most or all of these approaches, however, still call for the use of high filler loadings (ca. 60–65%). However, high filler loadings undesirably impose extrusion limitations, reduce elongation, increase density, and reduce impact strength at subzero temperatures.

Improvements have also been made upon compositions based on polyethylene-acrylate copolymers. One of the best performing materials includes a blend of polyethylene and EEA copolymer with less than 50% magnesium hydroxide and 2–5% red phosphorous. Red phosphorous alters the decomposition chemistry of EEA, acting as a char catalyst to increase the amount of carbonaceous char produced during burning. Adequate burn performance can be achieved at these reduced filler levels so that good elongation and good low temperature impact strength are retained at lower compound density. This material is also easier to extrude than competing EVA compounds. This balance of physical properties and fire protection makes the red phosphorous containing material one of the best non-olefinic flame retardant compositions for cable and wire insulation and jacketing. Unfortunately, because red phosphorous liberates toxic phosphine gas during storage, handling, and compounding, the use of red phosphorus is disfavored among many compounders.

In light of the foregoing, there exists a need for an improved flame retardant cable jacketing compound that is capable of meeting marketplace requirements for physical properties, burn performance, and extrudability without raising undue health concerns regarding toxicity. The present invention is directed to meeting this need.

SUMMARY OF INVENTION

The present invention relates to a composition which includes a hydrated inorganic filler and a polymer blend. The polymer blend includes a polymerization or copolymerization product of one or more ethylenically unsaturated monomers. In addition, the polymer blend includes an aliphatic polyketone.

The present invention also relates to a composition consisting essentially of about 10 to about 200 parts by weight of a hydrated inorganic filler and 100 parts by weight of a polymer blend. The polymer blend in this composition consists essentially of about 60 to about 99 weight percent of a copolymerization product of ethylene and one or more ethylenically unsaturated polar monomers and from about 40 to about 1 weight percent of an aliphatic polyketone.

The incorporation of aliphatic polyketone with polyethylene based polymers or copolymers results in dramatic improvements in both drip resistance and char strength. Furthermore, it has been found that the composition of the present invention can use reduced amounts of hydrated inorganic filler relative to conventional polyethylene based compositions. This reduction in the amount of hydrated filler is expected to lead to improvements in physical properties and extrudability not otherwise possible. These properties make the compositions of the present invention particularly useful as an outer layer for an electrical wire, an optical fiber, or a cable.

DETAILED DESCRIPTION OF THE INVENTION

The present invention relates to a composition which includes a hydrated inorganic filler and a polymer blend. The polymer blend includes an aliphatic polyketone and a polymerization or copolymerization product of one or more ethylenically unsaturated monomers. The polymer blend can also include more than one polymerization product, more than one copolymerization product, or combinations of one or more polymerization products and one or more copolymerization products.

Hydrated inorganic fillers suitable for use in the composition of the present invention include those which, upon thermal decomposition, release or produce water. One class of hydrated inorganic fillers that can be used in the composition of the present invention is hydrated alkaline earth carbonates, such as hydrated magnesium carbonate and hydrated calcium carbonate. Hydrated mixed-metal carbonates, such as calcium magnesium carbonate, can also be used. Also, mixtures of the above metal carbonates, for example, mixtures of calcium carbonate and magnesium carbonate, can be used. Mixtures of the above metal carbonates and the above mixed-metal carbonates, for example, a mixture of calcium carbonate and calcium magnesium carbonate, are also suitable. The hydrated alkaline earth metal carbonates are preferably used as such; however, alternatively or additionally, hydrated alkaline earth metal carbonate precursors can be used. Suitable hydrated alkaline earth metal carbonate precursors are those materials which generate alkaline earth metal carbonates upon processing or upon exposure of the resulting composition to sufficient heat. Examples of such hydrated alkaline earth metal carbonate precursors include alkaline earth metal bicarbonates, for example, magnesium bicarbonate and calcium bicarbonate. Another class of suitable hydrated inorganic fillers is the alkaline earth hydroxides, such as calcium hydroxide and, preferably, magnesium hydroxide. Aluminum trihydrate and hydrated zinc borate are other suitable hydrated inorganic fillers that can be used in the compositions of the present invention. Combinations of these hydrated inorganic fillers can also be employed, and "hydrated inorganic filler", as used herein, is meant to also include such combinations. The hydrated inorganic filler is preferably surface treated with an organic agent to improve dispersion of the filler within the polymer blend and to modify filler/polymer interfacial adhesion. Organic agents suitable for this purpose include fatty acids, vinylsilanes, aminosilanes, mercaptosilanes, epoxysilanes, and other organofunctional agents.

The hydrated inorganic filler is typically present in the form of small particles, for example, having mean diameters of from about 0.4 µm to about 100 µm, that are dispersed, preferably substantially uniformly, in the polymer blend. The relative amount, by weight, of the hydrated inorganic filler and polymer blend can range from about 10 to about 200 parts of filler per 100 parts of polymer blend. The preferred range is from about 70 to about 180 parts of filler per 100 parts of polymer blend, the more preferred range is from about 100 to about 150 parts of filler per 100 parts of polymer blend, and the most preferred range is from about 120 to about 150 parts of filler per 100 parts of polymer blend.

As noted above, the composition of the present invention includes a polymer blend which contains an aliphatic polyketone. Aliphatic polyketones are linear alternating polymers of carbon monoxide and at least one ethylenically unsaturated hydrocarbon. Suitable ethylenically unsaturated hydrocarbons include those that are wholly aliphatic, preferably those having up to about 20 carbon atoms, inclusive. More preferably, the ethylenically unsaturated hydrocarbons contain up to about 10 carbon atoms, inclusive, examples of which include ethylene, propylene, n-butene, n-octene, n-dodecene, and other α-olefins. Other suitable aliphatic hydrocarbons are arylaliphatic, i.e., containing an aryl substituent on an otherwise aliphatic moiety, particularly an aryl substituent on an ethylenically unsaturated carbon atom. Illustrative of this latter class of olefins are styrene, p-methylstyrene, m-methylstyrene, and p-ethylstyrene. Preferred aliphatic polyketones are copolymers of carbon monoxide and ethylene or terpolymers of carbon monoxide, ethylene and a second aliphatic α-olefin of three or more carbon atoms, particularly propylene, such as those having the structural formula:

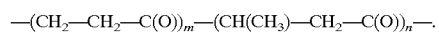

Of particular usefulness in the composition of the present invention are those polymers having a molecular weight from about 1,000 to about 200,000, particularly those having a molecular weight from about 10,000 to about 50,000, and containing substantially equimolar quantities of carbon monoxide and ethylenically unsaturated hydrocarbon. Suitable aliphatic polyketones are those having melting points from about 175° C. to about 300° C., preferably from about 175° C to about 230° C.

Aliphatic polyketones suitable for use in the compositions of the present invention can be produced by contacting carbon monoxide and ethylenically unsaturated hydrocarbon(s) under polymerization conditions in the presence of a catalytic amount of a catalyst formed from a compound of the Group VIII metals (e.g., palladium, cobalt, and nickel), the anion of a non-hydrohalogenic acid having a pKa less than about 6, preferably less than about 2, and a bidentate ligand of phosphorus, sulfur, arsenic, or antimony. Although the scope of the polymerization is extensive, for purposes of illustration, a suitable Group VIII metal compound is palladium acetate, suitable anions are a trifluoroacetic acid anion or a para-toluenesulfonic acid anion, and a suitable bidentate ligands are 1,3-bis(diphenylphosphino)propane or 1,3-bis[di(2-methoxyphenyl)phosphino]propane.

Polymerization of the aliphatic polyketone can be carried out under conventional polymerization conditions, typically at elevated temperature and pressure. Polymerization can be carried out in the gaseous phase or in the liquid phase in the presence of an inert diluent, e.g., a lower alcohol, such as methanol or ethanol. The reactants are contacted by conventional methods such as stirring or shaking, and, subsequent to reaction, the aliphatic polyketone product is recovered, for example, by decantation or filtration. The polymer product may contain metallic residues from the catalyst, which can be removed by contact with a solvent which is selective for the residues. Further details regarding the preparation of aliphatic polyketones are set forth, for example, in published European Patent Applications 181, 014, 121,965, 222,454 and 257,663, U.S. Pat. Nos. 4,808, 699 and 4,868,282 to Van Broekhoven et al., U.S. Pat. No. 4,761,449 to Lutz, U.S. Pat. Nos. 4,885,328, 4,921,897 and 4,935,304 to Danforth, and U.S. Pat. No. 5,648,117 to Londa et al., the respective disclosures of which are hereby incorporated by reference herein.

Suitable aliphatic polyketones can also be obtained commercially. For example, one particularly useful aliphatic polyketone is CARILON™ DP P1000, which can be obtained from Shell Chemical Company, Houston, Tex., under the product number D26HM100.

As noted above, the polymer blend, in addition to the above-described aliphatic polyketone, also includes a polymerization or copolymerization product of one or more ethylenically unsaturated monomers. Preferably, the polymerization or copolymerization product is present in an amount of from about 1 to about 99 weight percent of the polymer blend, and the aliphatic polyketone is present in an amount of from about 99 to about 1 weight percent of the polymer blend. More preferably, the polymerization or copolymerization product is present in an amount of from about 60 to about 99 weight percent of the polymer blend, and the aliphatic polyketone is present in an amount of from about 40 to about 1 weight percent of the polymer blend.

For example, the polymer blend can include a polymerization product of an ethylenically unsaturated monomer, such as ethene, isopropylene, 1-butene, 2-butene, and the like, which polymerization product has repeating units of —$CH_2CH_2$—, —$CH(CH_3)CH_2$—, —$CH(CH_2CH_3)CH_2$—, and —$CH(CH_3)CH(CH_3)$—. Other ethylenically unsaturated monomers, the polymerization of which produces polymers suitable for use in the polymer blend used in the composition of the present invention, include acrylic acid, methacrylic acid, and the esters of acrylic or methacrylic acid, examples of which include methyl acrylate, ethyl acrylate, 2-hydroxyethyl acrylate, propyl acrylate, butyl acrylate, hexyl acrylate, nonyl acrylate, methyl methacrylate, ethyl methacrylate, 2-hydroxyethyl methacrylate, propyl methacrylate, butyl methacrylate, hexyl methacrylate, and nonyl methacrylate. Another class of suitable ethylenically unsaturated monomers is the vinyl esters of organic acids, such as vinyl acetate, vinyl propionate, vinyl butyrate, and the like.

Alternatively, the polymer blend can include a copolymerization product of two or more ethylenically unsaturated monomers, such as the ethylenically unsaturated monomers referred to above. Examples of suitable copolymers for use in the composition of the present invention include copolymers of ethylene and a polar ethylenically unsaturated monomer. Polar ethylenically unsaturated monomers are ethylenically unsaturated monomers which contain one or more polar groups, such as a carboxylic acid group or a carboxylic acid ester group. They include esters of acrylic acids, methacrylic acids, such as methyl acrylate, ethyl acrylate, n-butyl acrylate, methyl methacrylate, ethyl methacrylate, and n-butyl methacrylate. In addition, they include vinyl esters of organic acids, examples of which are vinyl esters of acetic acid, propionic acid, butyric acid, and the like. The ratio of the ethylenically unsaturated monomers and the polar ethylenically unsaturated monomers present in the copolymerization product is controlled by controlling by the amounts of the various monomers present during copolymerization. For example, a copolymerization product which contains X % of polar ethylenically unsaturated component can be prepared by mixing X parts of polar ethylenically unsaturated monomer with 1000-X parts of ethene and then exposing the mixture to conditions effective to polymerize the mixture.

For cable jacketing applications, preferably, the copolymerization product has a density of from about 0.8 to about 1.1 g/cc, more preferably, from about 0.9 to about 1 g/cc, and a melt index (as measured according to the method described in ASTM D1238, which is hereby incorporated by reference herein) of from about 0.2 to about 20 g/10 minutes, more preferably from about 0.3 to about 1.5 g/10 minutes. Like polymerization, copolymerization can be effected by exposing the mixture of monomers to heat or light in the presence of a thermal initiator or a photoinitiator, respectively.

One preferred copolymerization product for use in the composition of the present invention is ethylene methyl acrylate ("EMA"), a copolymerization product of ethene and methyl acrylate. EMA resins having a methyl acrylate content of from about 2 to about 50 wt %, preferably from about 10 to about 30 wt %, more preferably from about 18 to about 24 wt % are suitable for use with the present invention. One such EMA resin is available as EMAC SP2202T from Chevron Chemical Co. (Houston, Tex.).

Another preferred class of suitable copolymers is copolymers of ethylene and a vinyl ester of a carboxylic acid, such as ethylene vinyl acetate ("EVA"). EVA resins having a vinyl acetate content of from about 2 to about 50 wt %, preferably from about 20 to about 35 wt %, and more preferably from about 25 to about 31 wt %, are particularly useful in the present invention. One such EVA resin is available as Elvax CM-576 from DuPont Polymers of Wilmington, Del.

As indicated above, the polymer blend of the composition of the present invention includes a polymerization product or copolymerization product of one or more ethylenically unsaturated monomers. The polymer blend can also include other polymer resins. For example, when the polymerization or copolymerization product is a copolymerization product of ethylene and an ethylenically unsaturated polar monomer (e.g., EVA or EMA), the polymer blend can further include a homopolymer of polyethylene (commonly referred to as low-density polyethylene ("LDPE")), a copolymer of ethylene and a C4 to C8 linear alkylene monomer ("commonly referred to as linear low density polyethylene ("LLDPE")), an ethylene-propylene rubber ("EPR"), an ethylene-propylene-diene monomer ("EPDM") rubber, or combinations thereof One LLDPE product found to be particularly useful in the practice of the present invention is EXACT™ SLX 9107, a metallocene catalyzed LLDPE, available from Exxon Chemical Company (Florham Park, N.J.). Preferably, the homopolymer of ethylene, the copolymerization product of ethylene and a C4 to C8 linear alkylene monomer, the ethylene-propylene rubber, and the ethylene-propylene-diene monomer rubber have a density of from about 0.87 g/cc to about 0.94 g/cc and are present in an aggregate amount of from about 1 to about 75 weight percent of said polymer blend.

In addition to the above polymers and copolymers, the composition of the present invention can, optionally, include other polymeric materials. For example, the composition of the present invention can include amounts of polyurethane. Preferably, the composition of the present invention is free or substantially free of polyurethane polymers. As used herein, polyurethane polymers have the meaning they are given in U.S. Pat. No. 4,935,304 to Danforth, which is hereby incorporated by reference herein. Compositions that are free of polyurethanes are meant to include those that have no detectable amount of polyurethane, and compositions that are substantially free of polyurethanes are meant to include those which contain less than about 5 weight percent of polyurethane relative to the weight of the polymer blend.

The polymer blend can optionally include a polymeric coupling agent in an amount of from about 1 part to about 20 parts, preferably from about 2 parts to about 15 parts by weight of said polymer blend. Examples of suitable polymeric coupling agents include olefinic copolymers and terpolymers containing about 0.1 wt % to about 10 wt % of reactive or highly polar functional groups, such as acrylic acid, methacrylic acid, and higher organic acids; maleic anhydride and other unsaturated anhydrides; and vinyl silanes. ATX325, an ethylene methyl acrylate acrylic acid terpolymer available from Exxon Chemical Company, Florham Park, N.J., is one particularly useful polymeric coupling agent. These polymeric coupling agents can be produced by copolymerizing a monomer containing the appropriate reactive or highly polar functionality as part of the monomer feed stream going into the polymerization reactor. Alternatively, they can be produced by a post reactor grafting reaction whereby the monomer containing the appropriate reactive or highly polar functionality is grafted onto a polymeric backbone in a twin screw extruder or similar device.

The composition according to the present invention, in addition to the above-described polymer blend and hydrated inorganic material, can also include other materials. For example, the composition of the present invention can contain one or more conventional additives, such as inhibitors of oxidative, thermal, and ultraviolet light degradation, preferably at levels which do not adversely affect the physical and chemical characteristics of the composition. For example, where the composition of the present invention is to be used as a jacketing material for electrical cables, the additives should not adversely affect the composition's electrical resistivity. Suitable stabilizers include citric acid powder (available, for example, from Cargill, Inc. (Minneapolis, Minn.) and hindered phenols (e.g., Irganox 1010 and Irganox MD 1026, available from Ciba-Geigy Corp. (Hawthorne, N.Y.)). Stabilizers are typically used in amounts of up to about 1 percent based on the total weight of the polymer blend. Ultraviolet light stabilizers, can be added in amounts of up to about 2 percent, based on the weight of the blend. Examples of suitable ultraviolet light stabilizers include various substituted resorcinols, salicylates, benzotriazoles, benzophenones, and combinations thereof. Where they are used, the optional stabilizers can be incorporated into the composition at any stage in the preparation of the composition. However, it is preferred that they be included at an early stage in the composition's preparation to preclude initiation of degradation of the composition while the composition is being prepared.

The composition of the present invention can also include lubricants and release agents, colorants (including dyes and pigments), fibrous and particulate fillers, fibrous and particulate reinforcing materials, nucleating agents, and plasticizers to improve its handling and processing properties (e.g., extrudability) and/or reduce its cost. Suitable lubricants and release agents, such as stearic acid, stearic alcohol stearamides, and combinations thereof can be present in the composition in amounts up to about 10 percent, based on the weight of the polymer blend.

Optionally, the composition of the present invention can also include a flame inhibiting silicone processing aid in an amount of from about 1 to about 20 weight percent of the hydrated inorganic filler. Suitable flame inhibiting silicone processing aids include polydimethylsiloxane gum dispersed on silica. These materials are described, for example, in U.S. Pat. No. 5,391,594 to Romenesko et al., which is hereby incorporated by reference herein. One suitable flame inhibiting silicone processing aid is DC 4-7081, an acrylate functionalized ultra high molecular weight polydimethylsiloxane dispersed on fumed silica. This material is available from Dow Corning Corp. of Midland, Mich.

The composition of the present invention can be prepared by providing a polymer blend containing a polymerization or copolymerization product of one or more ethylenically unsaturated monomers and an aliphatic polyketone and then mixing the polymer blend with the hydrated inorganic material.

Alternatively, the composition of the present invention can be made by providing one of the components of the polymer blend, mixing this one component and hydrated inorganic material, and then mixing the other component of the polymer blend with the mixture of the one polymer blend component and the hydrated inorganic material. For example, a polymerization or copolymerization product of the one or more ethylenically unsaturated monomers can be mixed with the hydrated inorganic material to form a first mixture, and the first mixture can then be mixed with the aliphatic polyketone to produce the composition of the present invention.

Alternatively, the components making up the polymer blend and the hydrated inorganic material can be dry blended together prior to commencement of the mixing step. In such a process, the hydrated inorganic material, the aliphatic polyketone, and the polymerization or copolymerization product of the one or more ethylenically unsaturated monomers are simultaneously mixed together.

Irrespective of the procedure used to prepare the composition of the present invention, all mixing steps should be carried out for a time and at a temperature effective to disperse the components being mixed in one another, preferably to homogeneity. Mixing can be carried out with any conventional mixing device, preferably one equipped with high shear mixing elements and a heating element for controlling the temperature at which the various components are being mixed. The mixing step or steps can be carried out using batch or continuous processes. Mixing is preferably effected by heating the polymeric resin component or components to a temperature above their melting point but below their decomposition point, typically at a temperature of from about 200° C. to about 250° C. Mixing can be carried out for a period of time of from about 1 minute to about 1 hour, preferably from about 2 minutes to about 15 minutes, at a mixer rotation rate sufficient to disperse the hydrated inorganic material. Where the hydrated inorganic material is one of the components to be mixed, it can be added simultaneously with or after the resin. Preferably, the resin is heated to melting prior to addition of the inorganic component. The remaining optional components of the polymer blend or composition can be added in one or more portions or continuously at any point during the mixing step or steps. Preferably, where a stabilizer, e.g., an antioxidant or ultraviolet stabilizer, is employed, it is added at the beginning of the mixing process to protect the polymeric resins from degradation during the mixing procedure.

When all of the components of the composition have been added and mixed with one another, the resulting composition can be pelletized, cooled to room temperature, and stored for future use. In some situations, prior to cooling, it can be advantageous to form the melted composition into a form (e.g., pellets) that can be conveniently handled during subsequent operations.

As indicated above, the composition of the present invention has improved flame retardancy properties. It can be used in many applications in which flame retardant polymeric materials are needed or desired. For example, the composition of the present invention can be used in fabricating a cable, for example, a fiber optic cable, such as those disclosed in U.S. Pat. No. 5,684,904, which is hereby incorporated by reference herein. Such a cable, to which the present invention also relates, includes one or more conductors, such as electrical wires, optical fibers, or combinations of electrical wires and optical fibers. The cable further includes a composition according to the present invention surrounding the one or more conductors. The composition of the present invention can individually surround one or more of the wires or optical fibers in the cable. In such a case, the composition of the present invention can be disposed directly on the wire or optical fiber, or it can be disposed on another material (e.g., another insulating polymer) which coats the wire or optical fiber. Rather than surrounding the wires or optical fibers individually, the composition of the present invention can surround a plurality of such wires or optical fibers in the form of a flame retardant cable jacket. Still alternatively, the composition of the present invention can be used to both surround the wires and optical fibers individually as well as to surround them collectively. Where the composition of the present invention is used in cables containing optical fibers, it is contemplated that the composition can be used as a primary or secondary coating for the optical fiber. Alternatively or additionally, the cable of the present invention can include other cable components made of or coated with the composition of the present invention, for example, buffer tubes, strength members, tapes, anti-buckling members, yarns, slotted rods, central members, filler rods, and ribbon matrix materials.

The above-described cable can be prepared by providing one or more wires, one or more optical fibers, or combinations thereof and surrounding the one or more wires, one or more optical fibers, or combinations thereof with a composition of the present invention.

For example, pellets of the composition of the present invention can be fed into an extruder, such as the kind used in conventional cable fabrication. Preferably, the extruder is designed and sized as required to plasticize and extrude a sufficient volumetric flow rate of the composition of the present invention. The required volumetric flow rate depends on the specific cable design and the desired linear rate of cable fabrication. Examples of extruders useful in the practice of the present invention are those manufactured by Davis Standard of Pawcatuck, Conn. The composition of the present invention, preferably in pelletized form, is converted to a molten state by applying heat and shearing within the extruder. The molten composition is then forced through an annular tip and die arrangement, which can be supported by a cross head attached to the end of an extruder. A cable core, including an electrical wire, an optical fiber, or a plurality of electrical wires and/or optical fibers is then pulled at a controlled rate through the center of the tip and die so that the core is surrounded by a layer of the composition of the present invention. As indicated above, the thickness of the layer of the composition of the present invention will vary depending on the performance requirements of the specific cable application.

The present invention is further illustrated by the following examples.

EXAMPLES

Example 1

Materials and Equipment

The following materials and equipment were used in the examples which follow.

Carilon DP P1000, an injection molding grade aliphatic polyketone having a density of 1.24 g/cc and a melting point of 220° C., was obtained from Shell Chemical Corp., Houston, Tex.

Citric acid, fine grade, was used as a polymer stabilizer and was obtained from Cargill, Inc., Minneapolis, Minn.

DC 4-7081, an acrylate functionalized, ultra high molecular weight polydimethylsiloxane dispersed on silica was obtained from Dow Corning Corp., Midland, Mich.

Elvax CM-576, an ethylene vinyl acetate copolymer ("EVA"), having a density of 0.950 g/cc, a melt index=0.5 g/10 minutes, and a vinyl acetate content of 28%, was obtained from DuPont Polymers of Wilmington, Del.

EMAC SP2202T, an ethylene methyl acrylate copolymer ("EMA"), having a density of 0.942 g/cc, a melt index of 0.4 g/10 minutes and a methyl acrylate content of 21%, was obtained from Chevron Chemical Corp., Houston, Tex.

Exact SLX 9107, a metallocene catalyzed linear low density polyethylene ("mLLDPE"), having a density of 0.909 g/cc and a melt index of 1.3 g/10 min was obtained from Exxon Chemical Company, Florham Park, N.J.

Irganox 1010, a phenolic antioxidant, was obtained from Ciba-Geigy Corp., Hawthorne, N.Y.

Zerogen 51, a high purity magnesium hydroxide (99.6% pure) having a fatty acid surface treatment and an average particle size of 0.7 microns, was obtained from J. M. Huber Corp., Macon, Ga.

A Brabender laboratory batch mixer, Model No. 00377, having a total bowl capacity of 680 cc was used for all mixing operations. Pressing was carried out using a Wabash Heated Press, Model No. 30-1515-4TM (30 tons). An Instron Universal Tester, Model No. 4201, was used to test tensile strength, elongation, and modulus.

ATX325 is an ethylene methyl acrylate acrylic acid terpolymer coupling agent having a density of 0.94 g/cc and a melt index of 20 g/10 min. It is available from Exxon Chemical Company, Florham Park, N.J.

Example 2

One Method for Preparing an EMA/Aliphatic Polyketone Composition

Ethylene methyl acrylate resin and antioxidant were added to the batch mixer at 220° C. and 50 rpm. From 1–4 minutes the magnesium hydroxide flame retardant was gradually added. Mixing was continued at 50 rpm until 7 minutes. At 7 minutes, the mixer temperature was reduced to 200° C., and the acid terpolymer coupling agent ATX325 was added to the mixer. At 9 minutes, the aliphatic polyketone was added. Compound mixing was continued until 16 minutes. The molten compound was then removed and compression molded at 150° C. into a 6"×6"×0.075" nominal slab. Specimens for tensile testing, limiting oxygen index ("LOI") testing, and a modified UL-94 were then die cut from the slab.

Example 3

Another Method for Preparing an EMA/Aliphatic Polyketone Composition

Ethylene methyl acrylate resin, antioxidant, and citric acid stabilizer were added to the batch mixer at 220° C. and 35 rpm. From 3–4 minutes the magnesium hydroxide flame retardant was gradually added at a mixer speed of 50 rpm. Mixing continued at 50 rpm until 8 minutes. At 8 minutes, the aliphatic polyketone was added. At 9 minutes, the mixer temperature was decreased to 180° C. At 11 minutes, the mixer speed was reduced to 10 rpm. At 18 minutes, the molten compound was removed and compression molded at 160° C. into a 6"×6"×0.075" nominal slab. Specimens for tensile testing, LOI, and a modified UL-94 were then die cut from the slab.

Example 4

Another Method for Preparing an EMA/Aliphatic Polyketone Composition

Ethylene methyl acrylate resin and aliphatic polyketone were dry blended and added to the batch mixer at 240° C.

and 20 rpm. The mixing speed was increased to 50 rpm. Antioxidant was added at 2.5 minutes. From approximately 6–10 minutes, the magnesium hydroxide flame retardant and the flame inhibiting silicone processing aid were gradually added to the mixer. At 11 minutes, the mixer temperature was decreased to 200° C. Compound mixing continued until 16 minutes. The molten compound was then compression molded at 180° C. into a 6"×6"×0.075" slab. Specimens for tensile testing, LOI, and a modified UL-94 were then die cut from the slab.

Example 5

Method for Preparing an EVA/Aliphatic Polyketone Composition

Ethylene vinyl acetate resin, polyethylene resin, and antioxidant were added to the batch mixer at 220° C. and 35 rpm. From 1–3 minutes, the magnesium hydroxide flame retardant was gradually added at a mixer speed of 50 rpm. Mixing continued at 50 rpm until 6 minutes. At 6 minutes, the aliphatic polyketone was added. At 9 minutes, the mixer temperature was decreased to 180° C. At 10 minutes, the mixer speed was reduced to 10 rpm. At 15 minutes, the molten compound was removed and compression molded at 160° C. into a 6"×6"×0.075" nominal slab. Specimens for tensile testing, LOI, and a modified UL-94 were then die cut from the slab.

Example 6

Sample Testing

Microdumbell samples were tested for tensile strength and elongation with a crosshead speed of 200 mm/minute. Secant modulus at 0.1% strain was determined for samples measured 150×6×2 mm nominal using a cross head speed of 50 mm/minute.

LOI testing was performed in accordance with ASTM D2863 on each of the formulations. The samples were conditioned at 50% relative humidity for a minimum of 24 hours prior to conducting this test.

A modified UL-94 test was also performed to evaluate burn performance. The test was performed inside a Plexiglas glove box having air vents at the top and an air intake at the bottom. The glove box was placed in a forced ventilation hood. Only non-forced, convective ventilation was assumed to be in effect inside the glove box. Die cut samples measuring approximately 150×6×2 mm were clamped from the top in a vertical position. A 20 mm flame similar to that described in the UL94 vertical burn test was applied approximately 13 mm below the sample such that the tip of the inner cone of the fame contacted the bottom edge of the sample. The flame was applied in the vertical direction until the sample failed by dripping or breaking or until 120 seconds lapsed, whichever occurred first. If the sample did not drip or break before 120 seconds, the flame was removed, and the sample was allowed to continue burning until it either burned to completion or self-extinguished with unburned polymer remaining Performance was described by time to failure.

The results of these tests are set forth in Table 1 for each of the materials produced in Examples 2–5.

TABLE I

| Example | 2 | 3 | 4 | 5 |
|---|---|---|---|---|
| | | (parts by weight) | | |
| Ingredient | | | | |
| EMAC SP2202T | 80 | 90 | 90 | |
| Elvax CM-576 | | | | 70 |
| SLX 9107 | | | | 20 |
| ATX 325 | 10 | | | |
| Carilon DP 1000 | 10 | 10 | 10 | 10 |
| Zerogen 51 | 100 | 122 | 135 | 150 |
| DC 4-7081 | | | 15 | |
| Citric acid stabilizer | | 3 | | |
| Irganox 1010 stabilizer | 0.3 | 0.4 | 0.3 | 0.4 |
| Test Results | | | | |
| Sample thickness, mm | 2.09 | 2.02 | 2.00 | 2.42 |
| Mod. UL94 time to failure, sec. | 102 | >120; extinguished; did not drip or break | >120; extinguished; did not drip or break | >120; extinguished; did not drip or break |
| LOI | 30 | 30 | 36 | 42 |
| Yield stress, Mpa | 8.6 | 6.7 | 6 | 7.9 |
| Peak stress, Mpa | 8.6 | 6.7 | 6 | 7.9 |
| Elongation at break, % | 167 | 64 | 329 | 101 |
| 0.1% mod., Mpa | 140 | 164 | 145 | 130 |

The results presented in Table 1 demonstrate that the compositions of Examples 2–5 have a low modulus and high flexibility as well as high elongation, a low tendency to drip during burning, and a high LOI. Moreover, Table 1 shows that these desirable properties are attainable with low filler loadings, which is expected to result in improved processing characteristics, lower manufacturing costs, and reduced weight.

It is believed that the incorporation of aliphatic polyketone with polyethylene based polymers or copolymers results in dramatic improvements in both drip resistance and char strength. Furthermore, it has been found that the composition of the present invention can use reduced amounts of hydrated inorganic filler relative to conventional polyethylene based compositions. This reduction in the amount of hydrated filler is expected to lead to improvements in physical properties and extrudability not otherwise possible. These properties make the compositions of the present invention particularly useful as an outer layer for electrical wires, optical fibers, or cables containing a plurality of such wires, fibers, or both.

Although the invention has been described in detail for the purpose of illustration, it is understood that such detail is solely for that purpose, and variations can be made therein by those skilled in the art without departing from the spirit and scope of the invention which is defined by the following claims.

What is claimed:

1. A composition comprising:

a hydrated inorganic filler; and a polymer blend comprising a polymerization or copolymerization product of one or more ethylenically unsaturated monomers, said polymer blend further comprising an aliphatic polyketone.

2. A composition according to claim 1, wherein said hydrated inorganic filler is present in an amount of from about 10 to about 200 parts per 100 parts, by weight, of said polymer blend.

3. A composition according to claim 1, wherein the polymerization or copolymerization product is present in an amount of from about 1 to about 99 weight percent of said polymer blend and wherein the aliphatic polyketone is present in an amount of from about 99 to about 1 weight percent of said polymer blend.

4. A composition according to claim 1, wherein the polymerization or copolymerization product is present in an amount of from about 60 to about 99 weight percent of said polymer blend and wherein the aliphatic polyketone is present in an amount of from about 40 to about 1 weight percent of said polymer blend.

5. A composition according to claim 1, wherein said polymerization or copolymerization product is a copolymerization product of ethylene and an ethylenically unsaturated polar monomer.

6. A composition according to claim 1, wherein said polymerization or copolymerization product is a copolymerization product of ethylene and an ethylenically unsaturated polar monomer selected from the group consisting of vinyl acetate, methyl acrylate, ethyl acrylate, n-butyl acrylate, methyl methacrylate, ethyl methacrylate, n-butyl methacrylate, and mixtures thereof.

7. A composition according to claim 1, wherein said polymer blend further comprises a homopolymer of ethylene, a copolymerization product of ethylene and a C4 to C8 linear alkylene monomer, an ethylene-propylene rubber, an ethylene-propylene-diene monomer rubber, or a combination thereof.

8. A composition according to claim 7, wherein the homopolymer of ethylene, the copolymerization product of ethylene and a C4 to C8 linear alkylene monomer, the ethylene-propylene rubber, the ethylene-propylene-diene monomer rubber, or the combination thereof is present in an amount of from about 1 to about 75 weight percent of said polymer blend.

9. A composition according to claim 7, wherein the homopolymer of ethylene, the copolymerization product of ethylene and a C4 to C8 linear alkylene monomer, the ethylene-propylene rubber, the ethylene-propylene-diene monomer rubber, or the combination thereof has a density of from about 0.87 g/cc to about 0.94 g/cc.

10. A composition according to claim 1, wherein said polymer blend further comprises a polymeric coupling agent in an amount of from about 1 part to about 20 parts by weight of said polymer blend.

11. A composition according to claim 1, wherein said hydrated inorganic filler is selected from the group consisting of magnesium hydroxide, aluminum trihydrate, hydrated zinc borate, hydrated calcium carbonate, hydrated calcium magnesium carbonate, and combinations thereof.

12. A composition according to claim 1 further comprising:

a flame inhibiting silicone processing aid.

13. A composition according to claim 12, wherein said silicone processing aid is a polydimethylsiloxane gum dispersed on silica.

14. A composition according to claim 12, wherein said flame inhibiting silicone processing aid is present in an amount of from about 1 to about 20 weight percent of said hydrated inorganic filler.

15. A composition according to claim 1, wherein said composition contains substantially no polyurethane.

16. A cable comprising:

one or more conductors; and a composition according to claim 1 surrounding said one or more conductors.

17. A cable according to claim 16, wherein said cable is a fiber optic cable.

18. A method for producing a cable comprising:

providing one or more conductors; and surrounding the one or conductors with a composition according to claim 1.

19. A method according to claim 18, wherein the cable is a fiber optic cable.

20. A composition consisting essentially of:

about 10 to about 200 parts by weight of a hydrated inorganic filler; and 100 parts by weight of a polymer blend, wherein said polymer blend consists essentially of about 60 to about 99 weight percent of a copolymerization product of ethylene and one or more ethylenically unsaturated polar monomers and from about 40 to about 1 weight percent an aliphatic polyketone.

21. A composition according to claim 20, wherein the ethylenically unsaturated polar monomer is selected from the group consisting of vinyl acetate, methyl acrylate, ethyl acrylate, n-butyl acrylate, methyl methacrylate, ethyl methacrylate, n-butyl methacrylate, and mixtures thereof.

22. A composition according to claim 20, wherein said hydrated inorganic filler is selected from the group consisting of magnesium hydroxide, aluminum trihydrate, hydrated zinc borate, hydrated calcium carbonate, hydrated calcium magnesium carbonate, and combinations thereof.

23. A cable comprising:

one or more conductors; and a composition according to claim 20 surrounding said one or more conductors.

24. A cable according to claim 23, wherein said cable is a fiber optic cable.

25. A method for producing a cable comprising:

providing one or more conductors; and surrounding the one or more conductors with a composition according to claim 20.

26. A method according to claim 25, wherein the cable is a fiber optic cable.

* * * * *